United States Patent
Sakai et al.

(10) Patent No.: US 10,209,507 B2
(45) Date of Patent: Feb. 19, 2019

(54) ELECTROWETTING DISPLAY DEVICE WITH BARRIER STRUCTURE

(71) Applicant: Amazon Technologies, Inc., Seattle, WA (US)

(72) Inventors: Toru Sakai, Waarle (NL); Abhishek Kumar, Tilburg (NL); Jeroen Cornelis Van Der Gaag, Mierlo (NL)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/188,845

(22) Filed: Jun. 21, 2016

(65) Prior Publication Data

US 2017/0363860 A1  Dec. 21, 2017

(51) Int. Cl.
*G02B 26/00* (2006.01)

(52) U.S. Cl.
CPC ................... *G02B 26/005* (2013.01)

(58) Field of Classification Search
CPC ............... G02B 26/005; G02B 5/201; G02B 2207/115; G02B 26/02; G02B 26/004; G02B 26/04; G02B 27/4233; G02B 5/0226
USPC ............... 359/237, 242, 265–267, 270–273, 359/290–292, 295, 296, 298
See application file for complete search history.

(56) References Cited

U.S. PATENT DOCUMENTS

| | | | |
|---|---|---|---|
| 9,500,852 B1* | 11/2016 | Tauk | G02B 26/005 |
| 2007/0268442 A1 | 11/2007 | Oh et al. | |
| 2013/0127817 A1 | 5/2013 | Hwang et al. | |
| 2013/0141317 A1 | 6/2013 | Choi et al. | |
| 2014/0355099 A1 | 12/2014 | Tsai et al. | |
| 2015/0372026 A1* | 12/2015 | Sato | H01L 27/1255 257/71 |
| 2017/0184839 A1* | 6/2017 | Tigelaar | G02B 26/005 |

FOREIGN PATENT DOCUMENTS

| | | |
|---|---|---|
| JP | 2013142753 | 7/2013 |
| WO | 2013050515 A2 | 4/2013 |
| WO | 2013079710 A1 | 6/2013 |

OTHER PUBLICATIONS

International Search Report and Written Opinion dated Oct. 5, 2017 issued on related patent Application No. PCT/EP2017/065127 filed Jun. 20, 2017.

* cited by examiner

*Primary Examiner* — Brandi Thomas
(74) *Attorney, Agent, or Firm* — EIP US LLP

(57) ABSTRACT

An electrowetting display device comprises a first support plate comprising a first electrode and a second support plate. A seal connects the first support plate to the second support plate. A first fluid and a second fluid, immiscible with the first fluid, are located between the first and second support plates. A second electrode is in electrical contact with the second fluid. An electrical connector connects the first electrode to the second electrode. A barrier structure at least partly surrounds the electrical connector. The electrical connector and the barrier structure are separated from the first fluid and the second fluid by the seal.

26 Claims, 7 Drawing Sheets

ELECTROWETTING DISPLAY DEVICE WITH BARRIER STRUCTURE

BACKGROUND

A known electrowetting display device includes an array of electrowetting elements. A support plate has a region outside the array of electrowetting elements in which a multitude of electrical components are arranged. Contact between electrical components that are intended to be electrically isolated from each other or between an electrical component and other parts of the electrowetting display device can occur, which can cause the electrowetting display device to malfunction.

It is desirable to provide an electrowetting display device that is more reliable.

DETAILED DESCRIPTION

Examples will be described below in relation to a barrier structure of an electrowetting display device. The barrier structure in examples at least partly surrounds an electrical connector connecting a first electrode of a first support plate of the electrowetting display device with a second electrode. A barrier structure may be a wall, partition, panel or fence, or a plurality or series of blocks, pillars, posts or other elements that, for example, extends along, or is curved around at least two or three sides of the electrical connector. Example barrier structures are described further below.

In examples, the electrical connector is applied as a paste on the first support plate or a second support plate. A paste is generally a fluid, which is typically relatively viscous, for example so that the paste may behave as a solid if a low level of stress is applied and as a liquid if a higher level of stress is applied. A paste may for example include a liquid component and a solid component, such as solid particles. With the electrical connector applied in this way, the barrier structure at least partly surrounding the electrical connector can localize or restrict or restrain flow of the electrical connector, such that the electrical connector is at least partly constrained from spreading or moving by the barrier structure. This can reduce the extent to which the electrical connector migrates to contact other parts of the electrowetting display device such as a seal connecting the first support plate and a second support plate. This can reduce the likelihood of damage to the seal. In examples, the barrier structure can also or alternatively reduce contact between the electrical connector and other electrical components of the electrowetting display device, reducing the likelihood of electrical short circuits occurring. Malfunctions of the electrowetting display device, for example due to sealing defects or electrical defects, can therefore be reduced or eliminated. Electrowetting display devices according to examples described herein may therefore be more reliable than a known electrowetting display device.

The structure of an example electrowetting element and its operation as part of an electrowetting display device will first be described with reference to FIGS. 1 and 2. Subsequently, the electrowetting display device, and in particular the barrier structure, according to examples will be described in more detail.

Figure 1:
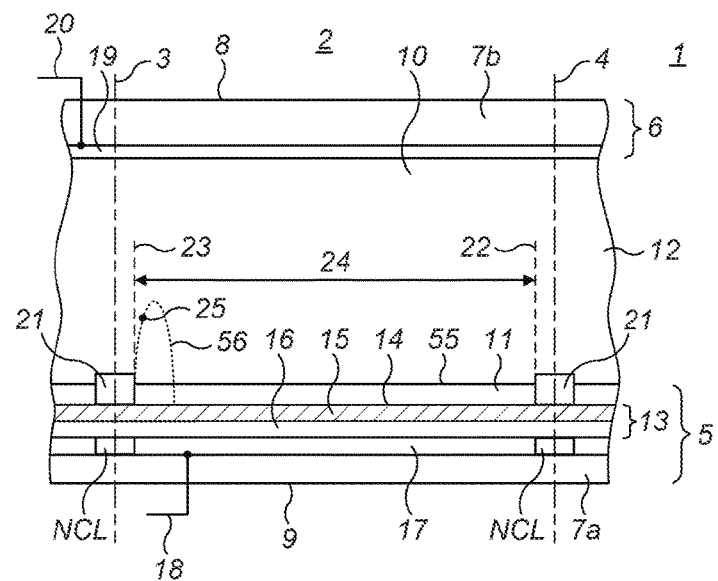
FIG. 1 shows schematically a cross-section of an example electrowetting element.

FIG. 1 shows a diagrammatic cross-section of part of an example of an electrowetting display device 1, which may be referred to as a display device, which includes a plurality of electrowetting elements 2, which may otherwise for example be referred to as picture elements or display elements, one of which is shown in the Figure and which may also be referred to as an electrowetting cell. The lateral extent of the electrowetting element is indicated in the Figure by two dashed lines 3, 4. The electrowetting elements comprise a first support plate 5 and a second support plate 6. The support plates may be separate parts of each electrowetting element, but the support plates may instead be shared in common by the plurality of electrowetting elements. The support plates may each include a glass or polymer substrate 7a, 7b and may be rigid or flexible.

The display device has a viewing side 8 on which an image or display effect formed by the display device can be viewed and a rear side 9. In the Figure a side of the first support plate 5 corresponds with the rear side 9; a side of the second support plate 6 corresponds with the viewing side 8; alternatively, in other examples, a side of the first support plate may correspond with the viewing side. The display device may be of the reflective, transmissive or transflective type. The display device may be an active matrix driven display device. The plurality of electrowetting elements may be monochrome. For a color display device the electrowetting elements may be divided in groups, each group having a different color; alternatively, an individual electrowetting element may be able to show different colors.

The second support plate 6 is positioned such that a first fluid 11 and a second fluid 12 are located between the first support plate 5 and the second support plate 6, in the space 10. In the example of FIG. 1, each electrowetting element 2 includes a respective portion of the first fluid 11 and the second fluid is shared by the array of electrowetting elements. However, in other examples, each electrowetting element may include a portion of the second fluid, for example where the second fluid is not shared by the array of electrowetting elements. At least one of the first and second fluids may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which corresponds with a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of the first fluid is not mixed with the majority of the volume of the second fluid.

The second fluid is electrically conductive or polar and may be water, or a salt solution such as a solution of potassium chloride in water. In examples, the second fluid is polar and in some examples is electrically conductive, but in other examples is not electrically conductive. The second fluid may be transparent. The first fluid is typically electrically non-conductive and may for instance be an alkane like hexadecane or may be an oil such as silicone oil. The first fluid is therefore non-polar in at least some examples.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, for example absorb substantially all parts of the visible spectrum, or reflecting. A reflective first fluid may reflect the entire visible spectrum, making the layer appear white, or part of it, making it have a color. In some examples, the first fluid is black and therefore absorbs substantially all parts of the optical spectrum, for example in the visible light spectrum. In other examples, the first fluid is another color than black and absorbs another part of the optical spectrum, for example a sub-range of wavelengths within the visible spectrum. In other examples, the display device includes electrowetting elements having first fluids which are respectively red, green or blue, or cyan, magenta and yellow to provide a full color display. Typically, by absorbing substantially all parts of the optical spectrum, there is nonetheless a degree of variation, therefore the first fluid may not absorb all wavelengths, but the majority of wavelengths within a given spectrum such as the visible spectrum, so as to perform the function of the first fluid in the electrowetting element. The first fluid may therefore be configured to absorb substantially all light incident on the first fluid. For example the first fluid may absorb 90% or more of light in the visible spectrum and incident on the first fluid.

The first support plate 5 includes an insulating layer 13. The insulating layer may be transparent or reflective. The insulating layer 13 may extend between walls 21 of an electrowetting element 2. To avoid short circuits between the second fluid 12 and electrodes arranged under the insulating layer, layers of the insulating layer may extend uninterrupted over a plurality of electrowetting elements 2, as shown in the Figure. The insulating layer has a surface 14 facing the space 10 of the electrowetting element 2. In this example the surface 14 is hydrophobic. The thickness of the insulating layer may be less than 2 micrometers and may be less than 1 micrometer. The surface is in contact with at least one of the first fluid or the second fluid, depending on the fluid configuration as described below.

The insulating layer may be a hydrophobic layer; alternatively, it may include a hydrophobic layer 15 and a dielectric layer 16 with predetermined dielectric properties, the hydrophobic layer 15 facing the space 10, as shown in the Figure. The hydrophobic layer is schematically illustrated in FIG. 1 and may be formed of Teflon® AF1600. The dielectric layer 16 may have a thickness, taken in a direction perpendicular to the plane of the substrate, of between 5 nanometers and several micrometers, for example between 50 nanometers and 2 or 3 micrometers. In other examples the thickness may be between 50 nanometers and 500 nanometers. The dielectric layer may be made of an inorganic material like silicon oxide or silicon nitride.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each electrowetting element 2 includes an electrowetting element electrode 17 as part of the first support plate 5. In examples shown there is one such electrowetting element electrode 17 per electrowetting element, although in other examples some or all electrowetting elements may have more than one electrowetting element electrode. The electrowetting element electrode 17 is electrically insulated from the first and second fluids by the insulating layer 13; electrowetting element electrodes of neighboring electrowetting elements are separated by a non-conducting layer NCL. In some examples, further layers may be arranged between the insulating layer 13 and the electrowetting element electrode 17. The electrowetting element electrode 17 can be of any desired shape or form. The electrowetting element electrode 17 of an electrowetting element is supplied with voltage signals by a signal line 18, schematically indicated in the Figure.

A second signal line 20 is connected to a second electrode 19 that is in electrical contact with the conductive second fluid 12. The second electrode may be common to all elements, for example when they are fluidly interconnected by and share the second fluid, uninterrupted by walls. The electrowetting element 2 can be controlled by a voltage V applied between the signal lines 18 and 20 and hence between the electrowetting element electrode 17 and the second electrode 19, which is therefore a voltage applied to the electrowetting element. The electrowetting element electrodes on the substrate 7a are coupled to a display driving system, described further below. In a display device having the electrowetting elements arranged in a matrix form, the electrowetting element electrodes can be coupled to a matrix of control lines on the substrate 7a via the signal line 18. The signal line 20 may be coupled to a display driving system.

The first fluid 11 in this example is confined to an electrowetting element by walls 21 that follow the cross-section of the electrowetting element. The extent of the electrowetting element, indicated by the dashed lines 3 and 4, is taken between the center of the walls. The area of the surface 14 between the walls of an electrowetting element, indicated by the dashed lines 22 and 23, is called the display area 24, over which a display effect occurs. The display effect depends on an extent that the first fluid and the second fluid adjoin the surface corresponding with the display area, in dependence on the magnitude of the applied voltage V described above. The magnitude of the applied voltage V therefore determines the configuration of the first and second fluids within the electrowetting element. In other words, the display effect depends on the configuration of the first and second fluid in the electrowetting element, which configuration depends on the magnitude of the voltage applied between the electrodes of the electrowetting element. For example, for controlling the configuration of the first and second fluids, a constant potential may be applied to the second electrode in contact with the conductive second fluid 12 and the magnitude of a potential applied to the electrowetting element electrode 17 on the substrate 7a may be controlled. The display effect gives rise to a display state of the electrowetting element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively. Thus, the display effect may in effect be controlled by controlling a configuration of the first fluid (and consequently the second fluid).

The first fluid 11 adjoins at least part of the display area 24. A size of the part of the display area adjoined by the first fluid depends on a voltage applied between the electrodes of the electrowetting element. In examples described herein, when a zero or substantially zero voltage is applied between the electrodes, for example when the electrowetting element is in an off state, the first fluid 11 forms a layer between the walls, as shown in FIG. 1 with the reference numeral 55. Typically, substantially zero in examples refers to a voltage which is minimal, for example as close to zero that the first fluid adjoins a maximum extent of the display area 24. Application of a voltage will retract the first fluid, for example against a wall as shown by the dashed shape 56 in FIG. 1. The controllable shape of the first fluid, in dependence on the magnitude of applied voltage, is used to operate the electrowetting element as a light valve, providing a display effect over the display area 24. For example, switching the fluids to increase adjoinment of the second fluid 12 with the display area 24 may increase the brightness of the display effect provided by the element.

This display effect determines the display state of the electrowetting element which an observer will see when looking towards the viewing side of the display device. The display device is capable of providing display states from black to white, including various intermediate grey states; in a color display device, the display state may also include color.

Figure 2:
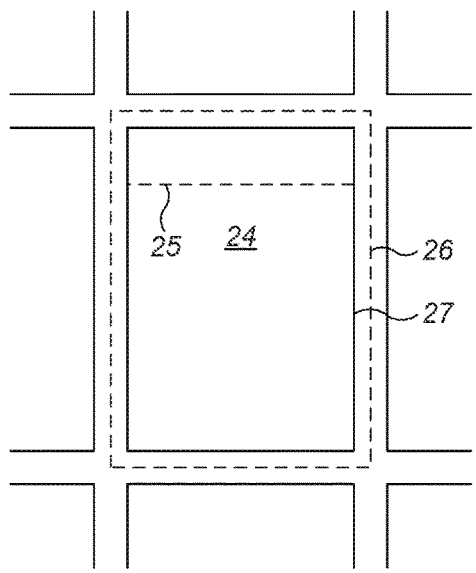
FIG. 2 shows schematically a plan view of the electrowetting element of FIG. 1.

FIG. 2 shows a plan view of the electrowetting element of FIG. 1. The lateral dimension of the central electrowetting element in FIG. 2, corresponding to the dashed lines 3 and 4 of the electrowetting element 2 in FIG. 1, is indicated by the dashed line 26. Line 27 indicates the inner border of a wall; the line is also the edge, for example a perimeter, of the display area 24. The dashed line 25 marks the boundary between the first fluid 11 and the second fluid 12 when a voltage is applied to the electrowetting element 2 to retract the first fluid 11 against the wall 21 such that the first fluid 11 has the dashed shape 56.

Figure 3:
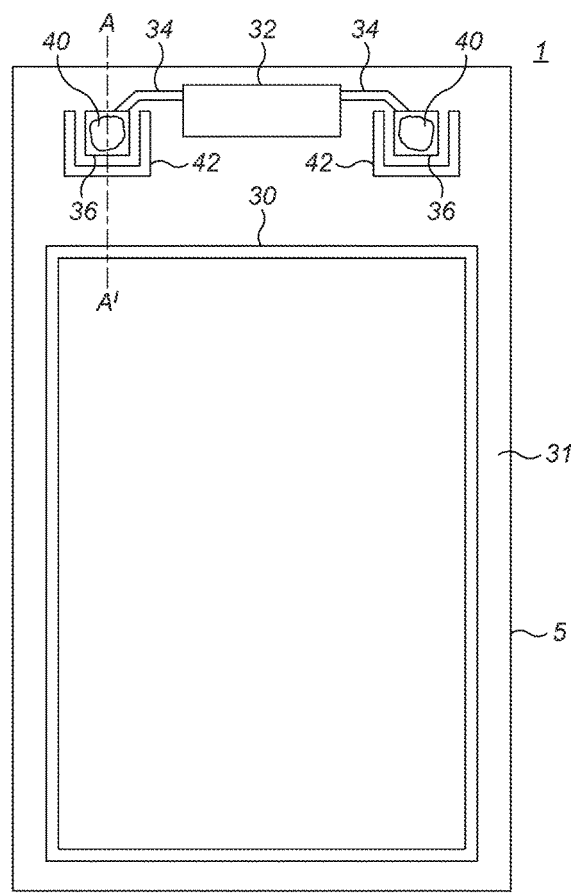
FIG. 3 shows schematically a plan view of an example electrowetting display device.

FIG. 3 shows schematically an example electrowetting display device 1 in plan view. FIG. 3 does not necessarily illustrate all components present in the example electrowetting display device 1; FIG. 3 is merely schematic and the electrowetting display device 1 may include further components not shown in the Figure. The electrowetting display device 1 of FIG. 3 includes an array of the electrowetting element 2 described with reference to FIGS. 1 and 2 (not shown in FIG. 3, for clarity). The array of electrowetting elements in the example of FIG. 3 is surrounded by a seal 30, which connects the first support plate 5 to the second support plate, although in other examples the seal may be absent. The seal may be considered to surround a periphery, for example an outer boundary or perimeter, of the array or matrix of electrowetting elements. The seal may therefore laterally bound, e.g. follow or go around a lateral extent of, the array of electrowetting elements. For example, the seal may be located such that it is beyond and outside, e.g. further from a central region of a surface of the first support plate or the second support plate, the array of electrowetting elements. For example, the seal may border, encircle or ring the array of electrowetting elements. The seal 30 may be any suitable shape in plan view, e.g. circular, ring-shape, rectangular, square or a non-regular or asymmetric shape, and will be described further below.

Outside the seal 30 there is a region, for example a border region 31, which surrounds the seal 30 and the array of electrowetting elements. For example, the border region may be a region of the electrowetting display device that is further from a central region of a surface of the first or second support plates than the array of electrowetting elements and the seal. In the example of FIG. 3, the border region 31 fully surrounds the seal 30. For example, the border region 31 is continuous around the seal 30. However, in other examples there are parts of the seal that are not surrounded by the border region; at least part of the seal may be formed at the edge or extremity of the electrowetting display device, with the seal connecting an edge of the first support plate with an edge of the second support plate, for example.

Various electrical or electronic components for use in controlling the array of electrowetting elements, for example to provide a desired display effect, may be arranged in the border region, in any suitable position. In other examples, at least one electrical or electronic component for controlling the array of electrowetting elements may be located in another region or regions of the first support plate, for example within the array of electrowetting elements and/or surrounded by the seal.

In examples, a display driving system, or components of a display driving system, may be located in the border region. A display driving system typically processes data relating to an image or display effect for display by one or more electrowetting elements of the display device and outputs appropriate signals for driving the one or more electrowetting elements. The data is for example received via an input line, for example an electrode or control line (not shown in FIG. 3).

A display driving system may include a display controller and a display driver. The display controller in examples includes at least one processor for processing data indicative of display states for the electrowetting elements to display, and at least one memory connected to the processor. Examples of the processor and memory are described further in relation to FIG. 10 below.

An output of the processor in examples is connected to the display driver, for example by a control line or electrode. The display driver in examples includes driver stages that transform the signals received from the processor to appropriate voltages for the display driver. The display driver may also change a serial signal input to it into parallel signals for controlling the voltages on electrodes of the display device, for example the electrowetting element electrodes and/or the second electrode. In a so-called direct drive display device, the electrowetting element electrodes are typically connected to the driver stages, and receive a voltage controlled directly by the display driver.

In a so-called active matrix display device, the display driver may include at least one display row driver, sometimes referred to as a source driver, and at least one display column driver, sometimes referred to as a gate driver, for example where the electrowetting elements of the electrowetting display device are arranged in a matrix of rows and columns. FIG. 3 shows such an example: in the border region 31 of FIG. 3, there is a driver contact area 32 for a display row driver and a display column driver, which are part of a display driving system. In such cases, the output of the processor may be connected by a respective suitable electrical component (not shown in FIG. 3) such as an electrode or control line to the display row driver and the display column driver.

In examples, the display row driver includes row driver stages that transform signals, e.g. received from the output of the processor, to the appropriate voltages for the display device. Row signal lines connect the row driver stages to respective rows of the display device for transmitting the voltage pulses generated in the display row driver to electrowetting elements in each row of the display device, thereby providing a row addressing signal to each row of the display device. The display row driver generates the voltage pulses used for addressing the rows of the display device, using information from the processor to set a value of the pulse duration of the voltage pulses for example.

The display column driver may also include column driver stages that transform signals, e.g. received from the output of the processor, to the appropriate voltages for the display device. Column signal lines connect the column driver stages to the columns of the display device, providing a column signal to each column of the display device in examples.

The display controller in examples determines which rows are selected for addressing and in which order. The selected rows may be consecutively addressed by applying an addressing signal, in the form of at least one voltage pulse, to each of these rows. When an electrowetting element is being addressed, the electrowetting element admits the column signal that is applied to the column signal line to which the electrowetting element is connected, thereby applying the signal level of the column signal to the electrowetting element electrode. For example, addressing the electrowetting element may include addressing an active element of the electrowetting element such as a transistor, for example a thin-film transistor (TFT). In examples, addressing a row means applying a signal on the signal line of the row that switches a transistor of each of the electrowetting elements of the row to a conducting state of the transistor. When the transistor of an electrowetting element receives at its gate a voltage pulse of its row selection signal, the transistor becomes conducting and passes the signal level of its display column driver to the electrowetting element electrode of the electrowetting element, as the skilled person (familiar with active matrix type systems) would understand.

In other examples, a column addressing signal may be applied to one or more, for example, each column of the display device to admit a signal level of a row signal to the electrowetting element electrode. In other words, the functions of the display row driver and display column driver may be swapped, with the display column driver used to generate a voltage pulse for addressing columns of the display device, for example to switch a transistor of each of the electrowetting elements of the column to a conducting state to pass the signal level of the display row driver to the electrowetting element electrode to set the corresponding electrowetting element in a desired display state.

The display driver may include a distributor (not shown in FIG. 3), for distributing data input to the display driver over a plurality of outputs connected to the driver stages. The distributor may be a shift register. The display row drivers may be integrated in a single integrated circuit. Similarly, the display column drivers may be integrated in a single integrated circuit. The integrated circuit may include the complete driver assembly. The integrated circuit in examples, such as that of FIG. 3, is integrated on the first support plate, although in other examples the integrated circuit may be integrated on the second support plate instead. The integrated circuit may include the entire display driving system. Such an arrangement may be known as a "chip on glass" (COG) construction. In other examples a "chip on foil" (COF) construction may be used, where the display column drivers and/or display row drivers may be integrated on a foil rather than on the first or second support plate, which foil is connectable to circuit lines of the first or second support plate for driving the picture elements.

In other examples, other or additional electrical or electronic components may be arranged in suitable locations in the border region or in other regions of the first support plate.

In examples, the display driving system is connected to a first electrode 36, to apply a potential to the second electrode 19 via the electrical connector 40. In the example of FIG. 3, the display driver of the display driving system is connected via a flexible foil 34 to the first electrode 36. In other examples, the display driving system and/or the display driver may instead be connected to the first electrode 36 via one or more electrodes, control lines, or cables, which may be flexible or rigid, or by the electrical connector 40. The first electrode 36 may be part of one or more control lines or electrodes for connecting electrowetting elements of the array of electrowetting elements to further electrical or electronic components, such as the display driving system or display driver. An electrical component is for example a component that is electrically conductive or that is powered by electricity. Electronic components may be considered to be a subset of electric components and typically have processing or decision making capability, either with or without software, for example using logic gates. For example, an electronic component may generally considered to be a component that uses electricity to manipulate or control electrical energy. In other examples, the electrowetting elements are connected to electrical or electronic components, such as the display driving system or the display driver, via other electrodes or control lines than the first electrode 36.

The first electrode 36 may be located in any suitable position in the first support plate. In the example of FIG. 3, the first electrode 36 is outside the seal 30, for example separated from the first fluid and the second fluid by the seal 30. In other examples, the first electrode may also or alternatively be located outside the array of electrowetting elements. The first electrode 36 may be separated from or positioned at a distance from electrical or electronic components, such as circuitry forming part of the display driving system, for example one or more electrical or electronic components located in the border region of the first support plate. For example, the first electrode 36 may be located in a first region of the first support plate extending along a first edge of the first support plate and an electrical component may be located in a second region of the first support plate extending along a second edge of the first support plate, the first region non-overlapping the second region. An edge of the first support plate is for example a lateral side of the first support plate. For examples an edge may correspond with a border or boundary at which a side of the first support plate closest to the viewing side 8 of the display device meets or contacts a different side of the first support plate that is roughly perpendicular to a plane of the viewing side 8, for example within 20 degrees of perpendicular to the plane of the viewing side. The first region and the second region may be separate, distinct regions, portions, three-dimensional volumes or two-dimensional areas of the first support plate. The first region may, for example, not encompass or be coincident with the second region.

As noted above, the first electrode 36 of FIG. 3 is connected to the second electrode 19, described above with reference to FIG. 1, via an electrical connector 40. In examples in which the first electrode 36 is located at a distance from electrical components, the electrical connector 40 may also be positioned at a distance from one or more electrical or electronic components, for example such that there is at least a minimum predetermined distance between the electrical connector 40 and one or more electrical or electronic components.

A first portion, such as a first end, of the electrical connector 40 may be in contact with the first electrode 36 and a second portion, such as a second end, of the electrical connector 40 may be in contact with the second electrode 19. In this way, the electrical connector 40 may directly connect the first electrode 36 to the second electrode 19, for example with no intervening elements or connectors. Alternatively, the electrical connector 40 may indirectly connect the first and second electrodes 36, 19. For example, the first portion of the electrical connector 40 may be in contact with the first electrode 36 and the second portion of the electrical connector 40 may be in contact with the second signal line 20, which is connected to the second electrode 19. By connecting the first electrode 36 to the second electrode 19 with the electrical connector 40, a voltage may be applied to the second electrode 19, for example from the display driving system, e.g. from a display driver arranged in the driver contact area 32. For example, a voltage may be applied from the display driving system, via the connection between the display driving system and the first electrode 36, such as the flexible foil 34, and from the first electrode 36 to the second electrode 19 via the electrical connector 40. For example, a constant potential may be applied to the second electrode 19 and a varying potential may be applied to the electrowetting element electrodes in dependence on the display effect for the respective electrowetting element to display. The second electrode 19 is in contact with the second fluid so that a voltage may be applied between the second fluid and the electrowetting element electrodes of the first support plate 5. For example, the first electrode 36 may be considered to be part of a common contact area for use in supplying a common potential to the second electrode 19 of the array of electrowetting elements.

In the example of FIG. 3, the first electrode 36 is formed as an outermost layer of the first support plate 5, with the surface of the first support plate 5 in the region where the first electrode 36 is arranged being the surface of the first electrode 36. However, in other examples, the first electrode 36 may not be an outermost layer of the first support plate. For example, there may be one or more other elements or layers between a surface of the first support plate and the first electrode 36, provided that the first electrode 36 may be electrically connected to the second electrode 19 via the electrical connector 40.

A barrier structure 42, which will be described further below, at least partly surrounds the electrical connector 40. The electrical connector 40 and the barrier structure 42 are separated from the first fluid and the second fluid, which are for example part of the array of electrowetting elements, by the seal 30 in this example. For example, the seal 30 may be between the electrical connector and the barrier structure and the first and second fluids, preventing the first and second fluids from flowing into the border region and contacting the electrical connector and the barrier structure. In other examples, the electrical connector and the barrier structure may be located differently with respect to the seal. For example, the electrical connector and the barrier structure may be surrounded by the seal, either inside or outside the array of electrowetting elements, or the seal may be absent.

With the barrier structure at least partly surrounding the electrical connector in examples, the barrier structure may reduce or prevent contact between the electrical connector and other components of the electrowetting display device, for example other components arranged in the border region. As explained above, the electrical connector may be applied in the form of a paste. By locating the barrier structure to at least partly surround, for example to partly enclose, border or encircle, the electrical connector, the electrical connector can be confined, constrained or isolated to occupy or contact a particular area of the first support plate, such as the area of the first support plate that includes the first electrode and that is at least partly surrounded by the barrier structure. The barrier structure in examples can therefore reduce the likelihood of or prevent the electrical connector contacting other components of the border region, such as electrical or electronic components arranged in the driver contact area 32, electrical components arranged elsewhere in the border region or the seal 30.

In the example of FIG. 3, the barrier structure 42 is located between the electrical connector 40 and the seal 30. The seal may bond or adhere the first and second support plates together. A sealed chamber or cavity may therefore be formed, with a perimeter or boundary corresponding to a combination of the seal and the first and second support plates, with the first and second support plates bounding an upper and lower extent of the cavity and the seal surrounding a side of the cavity, between the first and second support plates. In the example of FIG. 3, the first and second fluids are located between the first and second support plates, within the cavity; the seal 30 prevents the first and second fluids from escaping or flowing out from between the first and second support plates. In the example of FIG. 3, the seal is arranged in a pre-determined pattern, which aligns with or follows a shape corresponding to a boundary of a display region, within which the array of electrowetting elements is located. In FIG. 3, the seal is arranged in the shape of a rectangle in plan view, although it will be appreciated that the seal may be arranged in other shapes in other examples. For example, in some cases, the seal may not be arranged in a pre-determined pattern, and may have an irregular shape.

With the barrier structure 42 in the example of FIG. 3 located between the electrical connector 40 and the seal 30, the barrier structure 42 may prevent or reduce movement or flow of the electrical connector 40 towards and along the seal, for example if the electrical connector 40 is deposited as a paste, fluid or liquid. This is due to the location of the barrier structure 42 in the path from a region where the electrical connector 40 is deposited (within the u-shape of the barrier structure 42 in FIG. 3) to the seal 30. By reducing or preventing contact between the electrical connector 40 and the seal 30, mixing of the material of the seal 30 and the material of the electrical connector 40 may be reduced. Such mixing of the respective material of the seal 30 and the electrical connector 40 can weaken the seal, which can reduce the integrity of the seal and may lead to holes, gaps or incompleteness in the seal. This may allow the first and/or second fluid to escape from the array of electrowetting elements, which can adversely affect the function of the display device and reduce its lifetime. Therefore, by providing a barrier structure 42 between the electrical connector 40 and the seal 30, the integrity of the seal may be maintained, increasing the reliability and lifetime of the display device.

In FIG. 3, the first electrode 36 is rectangular in plan view, with four sides. The barrier structure 42 extends along three sides of the first electrode 36, to form a u-shape. In other examples, the barrier structure may extend along fewer, for example two, or more sides of the first electrode. The barrier structure may also extend along two or more, for example two or three, sides of the electrical connector. Where the electrical connector has a curved shape in plan view, the barrier structure may be considered to extend along two or three sides of the electrical connector where the barrier structure extends along two or three sides of the smallest rectangle that may be drawn to completely contain the electrical connector. In the example of FIG. 3, the electrical connector 40 is approximately circular in plan view, e.g. with a radius that varies by less than 10% around the circumference of the electrical connector in plan view.

The barrier structure 42 of FIG. 3 may be considered to be a wall, for example a partition, screen or panel. Such a wall may in some examples be continuous for example. In FIG. 3, the barrier structure 42 has what may be considered to be three substantially straight, for example, with a deviation of less than 10% from straight, wall segments. The example barrier structure 42 of FIG. 3 has a first wall segment 42a, a second wall segment 42b and a third wall segment 42c, which are illustrated as the left-hand, lower and right-hand wall segments in the Figure. Each of the first, second and third wall segments 42a, 42b and 42c of FIG. 3 are respectively straight, for example without deviation from a particular direction, with the first and third wall segments 42a, 42c arranged parallel to each other and the second wall segment 42b arranged perpendicular to and between, for example to connect, the first and third wall segments 42a, 42c. The barrier structure 42 of FIG. 3 may therefore be considered to be a substantially u-shape wall at least partly surrounding the electrical connector. In other examples, the barrier structure may comprise fewer or more than three substantially straight wall segments, for example at least two substantially straight wall segments, and the barrier structure may include a curved wall segment or a substantially u-shape segment in addition to one or more straight or substantially straight wall segments. For example, the barrier structure may be a curved wall in plan view, such as a wall with a horseshoe or semi-circular shape, for example a shape that is substantially u-shape but with a continuous or gradual curve rather than sharp edges, corners or changes in direction. The shape of the barrier structure may be selected to improve the mechanical strength and robustness of the display device and reduce the extent to which the first and second support plates may be deformed towards each other when pressure is applied to one or both of the first and second support plates, for example by a user.

In the example of FIG. 3, there are two flexible foils 34, two first electrodes 36, two electrical connectors 40 and two barrier structures 42, one on the left-hand side of the Figure and one on the right-hand side of the Figure. In other example electrowetting display devices, there may be one or more than two of some or all of these components.

Figure 4:
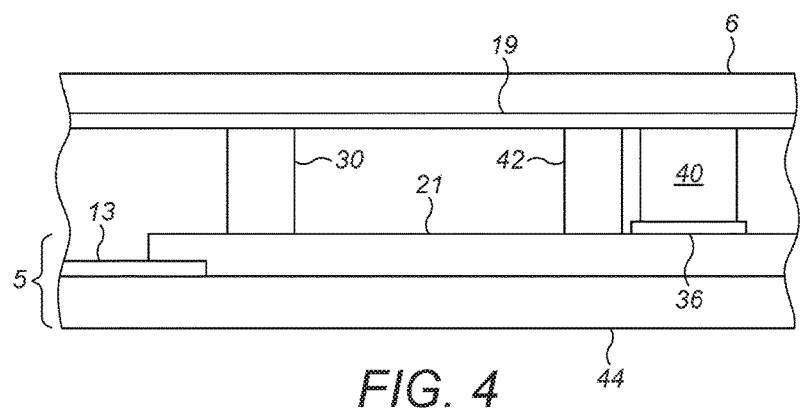
FIG. 4 shows schematically a cross-section of part of the example electrowetting display device of FIG. 3 along the line A-A' of FIG. 3.

FIG. 4 shows schematically a cross-section along the line A-A' of part of the example electrowetting display device of FIG. 3. In FIG. 4, the first electrode 36 is shown as an electrically conducting layer on, and in contact with, a layer of material for forming walls 21 of the electrowetting elements of the array of electrowetting elements. In other examples, there may be other intervening layers between the first electrode and the layer of wall material or the first electrode may be formed so that it does not overlap or cover the layer of wall material. The first electrode 36 may also be formed such that it does not project from the surface of the layer supporting the first electrode. For example, an underlying layer may be patterned, for example using a photolithographic process, to create an indentation in its surface. One or more further layers may be applied to the underlying layer and may copy the indentation in the underlying layer. The first electrode may then be formed within the indentation of or copied from the underlying layer, for example so that the surface of the first electrode is coincident with, for example continuous with, the surface of the supporting layer surrounding the first electrode. The first electrode may also be part of a layer of electrically conductive material that also includes the electrical components (not shown in FIG. 4, for clarity) connecting the driver contact area to the first electrode and the first electrode to the electrowetting elements and/or the electrowetting element electrodes. For example, these components may be formed in the same process step. In other examples, these components may be formed separately. For example, other electrical components may lie beneath or be covered by the first electrode.

In the example of FIG. 4, the barrier structure 42 is between and in contact with the first support plate 5 and the second support plate 6. In further examples, the barrier structure may not contact one or both of the first support plate and the second support plate. For example, the barrier structure may extend partway from one support plate to the other or the barrier structure may not be fixed to or part of either support plate, so that it can move from contacting one support plate to contacting the other support plate, e.g. under gravity as the display device is moved. The barrier structure 42 of FIG. 4 is shown as a separate structure, which is not part of either support plate. However, in other examples, the barrier structure may be part of the first support plate or the second support plate, and may extend or protrude at least partly from the first support plate to the second support plate or vice versa. The barrier structure typically comprises a photoresist material, allowing the barrier structure to be patterned to a desired shape and size using a photolithographic process well known to the skilled person.

In the example of FIG. 4, the barrier structure 42 comprises a first photoresist material and the walls 21 comprise a second photoresist material, different from the first photoresist material. The first and second photoresist materials may be selected based on the different functions of the barrier structure 42 and the walls 21 of the electrowetting elements 2. For example, the second photoresist material may be less viscous than the first photoresist material to facilitate spreading of the second photoresist material across the electrowetting display device during manufacture, which may be undesirable for the barrier structure localised in the border region of the display device. For example, the barrier structure may be or comprise an acrylate or epoxy-based material such as SU8. In examples, the walls may also comprise SU8.

The first support plate 5 of FIG. 4 is similar to that described above with reference to FIG. 1. The first support plate 5 includes an insulating layer 13 such as the insulating layer 13 of FIG. 1, and the material for forming walls 21. The first support plate 5 of FIG. 4 also includes one or more other layers 44, which are not shown for clarity but typically include a substrate and a plurality of electrowetting element electrodes such as those described with reference to FIG. 1.

The second support plate 6 of FIG. 4 includes the second electrode 19. The second electrode 19 in this example is located as an outermost layer of the second support plate 6, with the second electrode 19 in electrical contact with the second fluid of the electrowetting elements (not shown in FIG. 4). However, in other examples, the second electrode 19 may be arranged in a different location. For example, the second electrode 19 may be a separate element that is not part of the second support plate.

The electrical connector 40 is illustrated schematically in FIGS. 3 and 4. In these examples, the electrical connector 40 includes silver particles. For example, the electrical connector 40 may include conductive silver flakes CW2200 from Chemtronics®, 8125 Cobb Center Drive, Kennesaw, Ga. 30152, USA. These silver particles are typically part of a paste that also includes a carrier fluid that evaporates after the electrical connector is deposited in the desired location. In other examples, the electrical connector may include at least one of: silver particles, electrically conductive particles, an adhesive, balls comprising gold such as solid gold balls, or balls comprising a gold surface. For example, the balls comprising a gold surface may be plastic balls coated with a gold layer. In examples in which the electrical connector includes an adhesive, the electrical connector may perform a dual function of electrically connecting the first electrode and the second electrode and also adhering or mechanically connecting the first support plate and the second support plate together. Where the electrical connector includes balls, the diameter of the balls may be within 20% of the desired distance between the first and second support plates in the electrowetting display device. For example, the balls may have a diameter of approximately 24 micrometers, e.g. 24 micrometers within manufacturing tolerances, and the desired distance between the first and second support plates may have a diameter of approximately 20 micrometers, e.g. 20 micrometers within manufacturing tolerances. The balls may be deformable, for example so that the balls may be compressed to a diameter corresponding to the desired distance between the first and second support plates when the first and second support plates are brought together during manufacture of the display device. This for example may help ensure that the balls remain in contact with the first and second electrodes during use of the display device.

Figure 5:
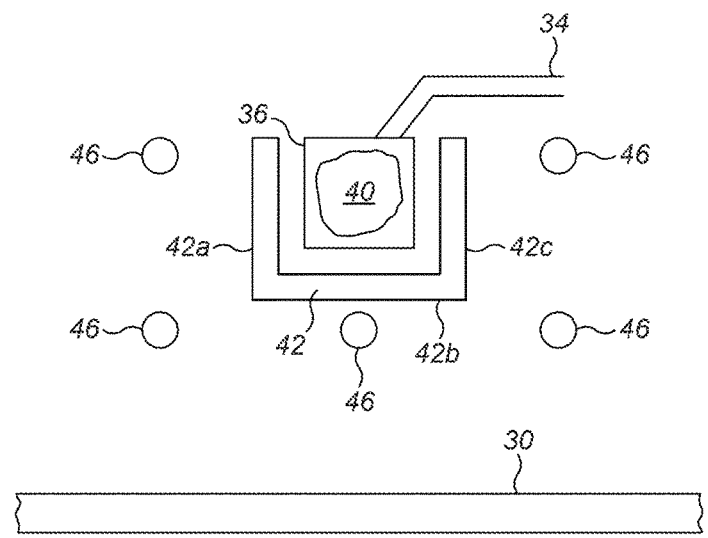
FIG. 5 shows schematically a plan view of part of an example border region of an electrowetting display device including an example barrier structure.

FIG. 5 shows schematically a plan view of part of a border region of an electrowetting display device including an example barrier structure. The barrier structure 42 of FIG. 5 is similar to that described above with reference to FIGS. 3 and 4; a corresponding description should be taken to apply. In addition to the barrier structure 42, the part of the border region in FIG. 5 also includes a plurality of spacers 46 between the first support plate and the second support plate. Otherwise, the border region is similar to that described with reference to FIGS. 3 and 4; a corresponding description applies. The spacers 46 are substantially electrically non-conductive and are separated from the first fluid and the second fluid by the seal 30. For example, a spacer 46 may be electrically non-conductive to the extent that, if the spacer 46 came into contact with the electrical connector 40, the spacer 46 would not adversely affect the operation of the display device.

A spacer is typically a post, pillar or other element that protrudes or extends from one of the first support plate or the second support plate towards the other of the first support plate and the second support plate to provide a separation between the first and second support plates. For example, a spacer may prevent the first and second support plates from being brought closer together than a pre-determined minimum separation, such as a minimum separation to avoid damage to the display device. A spacer may be a protrusion of one of the first or second support plates or it may be a separate element that is not part of either support plate. A spacer may extend between and contact both the first and second support plates or may only contact or be part of one of the support plates.

In the example of FIG. 5, the spacers are located in the border region, outside the cavity formed by the seal and the first and second support plates. Locating spacers in this region may be used to maintain a distance or gap between the first and second support plates during manufacture of the electrowetting display device. For example, a plurality of electrowetting display devices may be manufactured with a shared or common first and/or second support plate. The shared first and/or second support plate may be separated into a plurality of separate display devices using a so-called "scribe and break" process, which the skilled person will be familiar with. By arranging the spacers in the border region, the robustness of the display device may be improved during such a scribe and break process, reducing the extent of deformation of the first and second support plates towards each other. This can reduce the stress placed on the first and/or second support plates during the manufacturing process and reduce the likelihood of fractures or breakage of one or both of the first and second support plates.

The spacers in FIG. 5 are arranged in a pre-determined pattern, which in this example is a regular, symmetric pattern. In other examples, the spacers may be arranged irregularly. In examples such as that of FIG. 5, the spacers surround the barrier structure on at least one, for example two, three or all, sides. In other examples, spacers may be arranged at a distance from the barrier structure. The border region may include one spacer or a plurality of spacers, and there may also be one or more spacers within the display region of the display device, for example within the cavity of the display device. Spacers within the display region may additionally increase the robustness of the display device during use. Spacers in the display region may be similar to or the same as the spacers outside the display region, for example in the border region, as described above. In other examples, spacers in the display region may have a different structure and/or be manufactured from a different material than spacers outside the display region, as the skilled person will appreciate.

In the example of FIG. 5, the barrier structure 42 is elongate in a direction parallel to a plane of the second support plate so as to at least partly surround the electrical connector. For example, a length of the barrier structure in plan view from one end to the other is longer than a height of the barrier structure. In this example, the spacers are elongate in a direction perpendicular to the plane of the second support plate to extend between and in contact with the first support plate and the second support plate. For example, the spacers may be longer in a direction from the first support plate to the second support plate than in a direction parallel to the plane of the second support plate. In other words, the barrier structure 42 and the spacers 46 are elongate, e.g. with a longest dimension, in planes that are approximately orthogonal to each other, for example, within plus or minus 10 degrees from each other.

Figure 6:
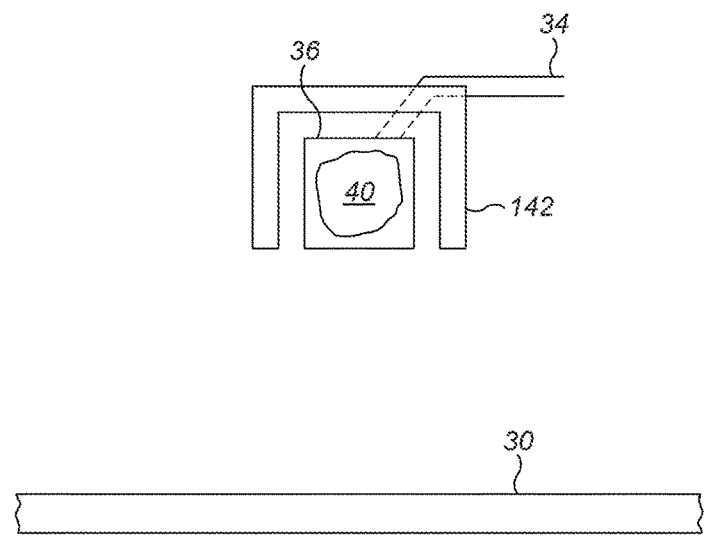
FIG. 6 shows schematically a plan view of part of an example border region of an electrowetting display device including a different example barrier structure.

FIG. 6 shows schematically a plan view of part of a border region of an electrowetting display device including a different example barrier structure from that illustrated in FIG. 5. Other than the barrier structure, the part of the border region of FIG. 6 is similar to the border region of FIGS. 3 and 4; corresponding descriptions should be taken to apply of the elements present in the border region other than the barrier structure. As in FIGS. 3 and 4, the first electrode 36 is connected to the flexible foil 34. The flexible foil 34 is connected to a display driver of a display driving system via a driver contact area (not shown). A display driver is an example of an electronic component; the first electrode 36 of FIG. 6 may therefore be considered to be connected to an electronic component. A display driver may also be considered to be an electrical component; for example electronic components may be considered to be a subset of electrical components. Other electrical components include other drivers, microcontrollers, capacitors, control lines, further electrodes, or components of the display driver, as the skilled person will appreciate. The barrier structure 142 of FIG. 6 is located between the electrical connector 40 and the electrical component (in this example, the display driver). For example, the barrier structure 142 is located to interrupt or intersect a direct path between the electrical connector 40 and the electrical component. With the barrier structure 142 arranged in such a location, the barrier structure 142 may prevent or reduce flow or movement of the electrical connector 40 from the region in which the electrical connector 40 is deposited to the electrical component. The barrier structure 142 may therefore reduce the likelihood of the electrical connector 40 coming into contact with the electrical component, which can reduce the likelihood of a short circuit occurring. This can improve the operation of the display device so that it is for example more reliable.

Figure 7:
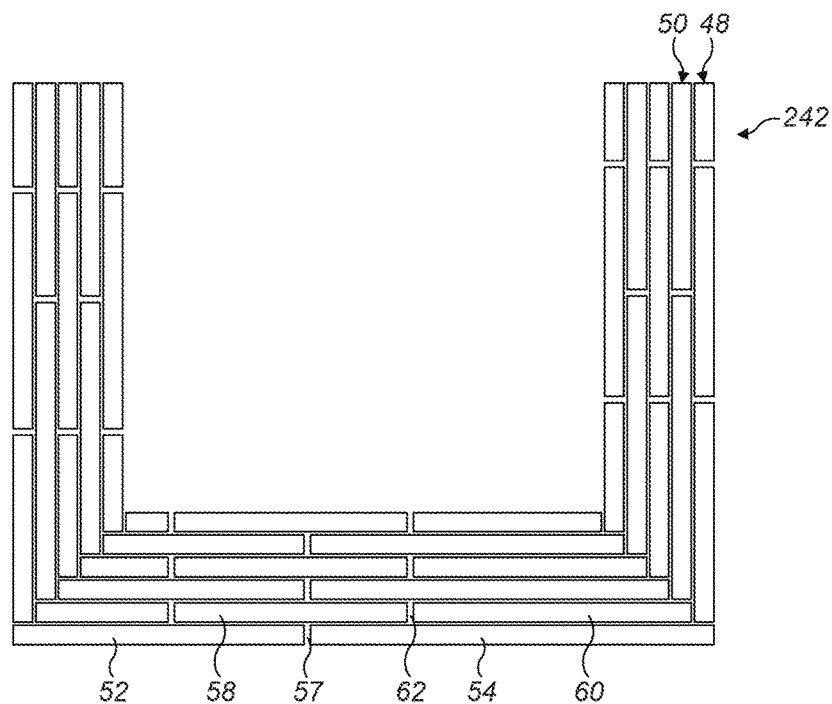
FIG. 7 shows schematically a plan view of an example barrier structure.

In other examples, the barrier structure may have a different structure or form than the barrier structures 42, 142 of FIGS. 5 and 6. For example, FIG. 7 shows schematically an illustrative example of a barrier structure 242 according to a different example. The barrier structure 242 of FIG. 7 in examples at least partly surrounds an electrical connector, such as the electrical connector described with reference to FIGS. 3 to 6 and may be located between the electrical connector and a seal, such as the barrier structure of FIGS. 3 to 5, or between the electrical connector and an electrical or electronic component, such as the barrier structure 142 described with reference to FIG. 6. The barrier structure 242 of FIG. 7 incudes a plurality of barrier elements. Each barrier element may form an individual barrier and may be for example a wall, a post, a block or a pillar. A barrier element in the form of a wall or a block is for example a protruding structure that is elongate around at least part of the electrical connector. For example, a length of such a barrier element in a plane parallel to a plane of the second support plate may be greater than a height of such a barrier element in a plane perpendicular to the plane of the second support plate. A barrier element in the form of a wall or a block typically has a rectangular cross section, although other cross sections are possible as the skilled person will appreciate. A barrier element in the form of a post or a pillar may be a relatively long and slim element extending between the first and second support plate, for example at an angle of between plus or minus 20 degrees of a plane perpendicular to the plane of the second support plate. For example, a post or a pillar may have a height in the plane perpendicular to the plane of the second support plate that is larger, for example an order of magnitude larger, than a length of the post or pillar in a plane parallel to the plane of the second support plate. A post or a pillar may have any suitable cross section, for example rectangular, square or circular. In FIG. 6, each barrier element is a block, although other examples may include barrier elements of different shapes and sizes from each other. Use of a plurality of barrier elements as a barrier structure rather than a solid or continuous barrier structure can improve the reliability of the manufacturing of the electrowetting display device. For example, a large continuous barrier structure may be prone to delamination from the first or second support plate on which it is located or part of, for example as the barrier structure may be put under tension when pressure is applied to the first and/or second support plate or when one or both of the first or second support plates is bent or flexed.

As for the example in which the barrier structure is a continuous structure such as a wall, the plurality of barrier elements may together form a pattern which extends along two or three sides of the electrical connector and may be arranged in one or more straight or curved lines. For example, the pattern of the plurality of barrier elements taken as a whole may be horseshoe-shaped, substantially u-shaped or semicircular, as for the example in which the barrier structure is one continuous element.

The barrier elements may be arranged according to a pre-determined pattern. For example, the plurality of barrier elements in FIG. 7 includes a plurality of rows of barrier elements. Labelled in FIG. 7 are a first row of barrier elements 48 and a second row of barrier elements 50. The first row of barrier elements 48 in FIG. 7 includes a first barrier element 52 and a second barrier element 52 with a first gap 57 therebetween. A gap is for example a space or distance between two barrier elements, such as two neighbouring, adjacent or closest barrier elements, for example neighbouring, adjacent or closest barrier elements within the same row or column. The second row of barrier elements 50 includes a third barrier element 58 and a fourth barrier element 60 with a second gap 62 therebetween. The first gap 57 is offset from the second gap 62. For example, the first gap 57 and the second gap 62 are not aligned, such that it is not possible to draw a straight path through the first and then the second gap 57, 62. This may improve the containment or confinement of the electrical connector by the barrier structure, for example by diverting the electrical connector to follow a tortuous path rather than a direct or straight path through the barrier elements. Gaps between barrier elements are typically around 5 micrometers.

Figure 8:
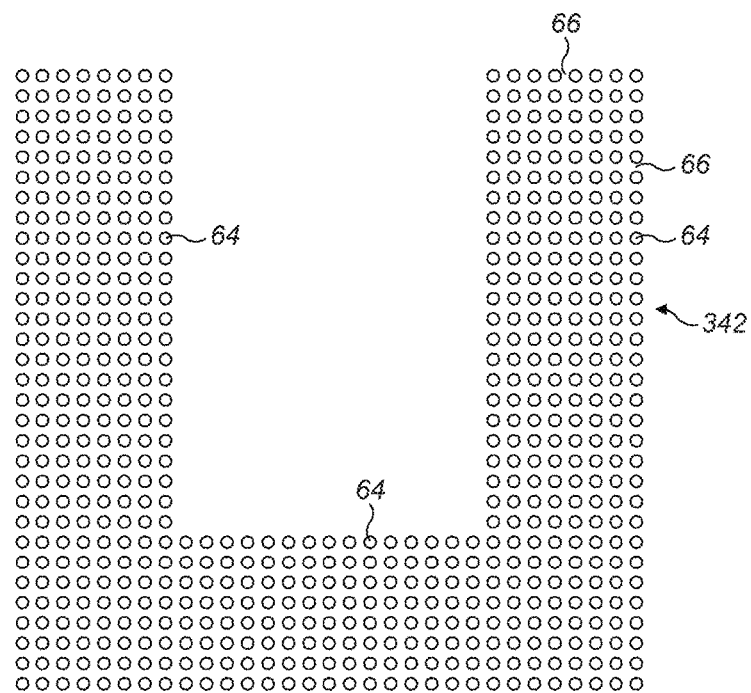
FIG. 8 shows schematically a plan view of a different example barrier structure.

In other examples, however, barrier elements may be aligned such that a first gap aligns with a second gap, providing a direct or straight path through the barrier elements. FIG. 8 shows such an example; barrier elements of the example barrier structure 342 are illustrated with the reference numeral 64 and the gaps between neighbouring, adjacent or closest barrier elements in a row are labelled with the reference numeral 66. The barrier elements in the example of FIG. 8 are pillar shaped, for example post or column shaped rather than block shaped as in the example of FIG. 7. Other features of FIG. 8 are similar to those of FIG. 7; corresponding descriptions should be taken to apply.

Figure 9:
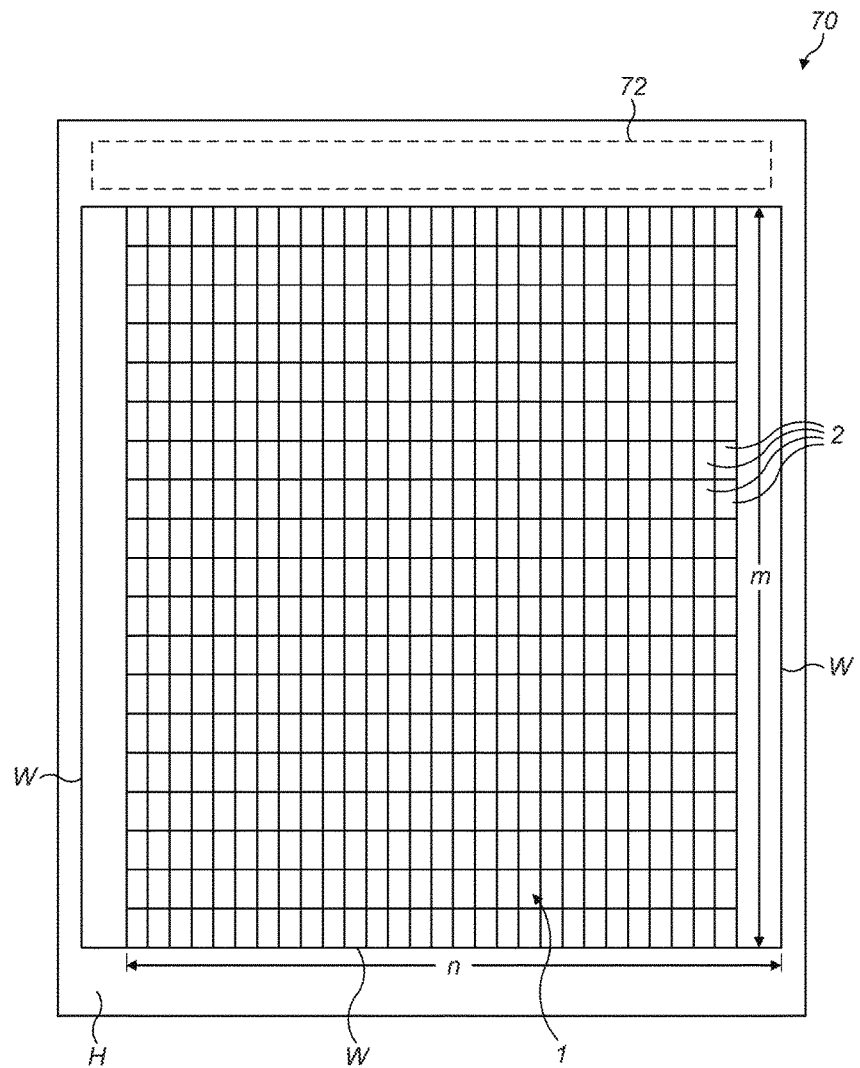
FIG. 9 shows schematically a plan view of an example apparatus.

FIG. 9 shows schematically an apparatus 70 according to examples. The apparatus 70 includes an electrowetting display device 1, which includes a plurality of electrowetting elements 2. The electrowetting elements are for example arranged in an array, for example as shown in FIG. 9 a matrix of m rows and n columns, where each of m and n are integers. The electrowetting display device 1 and electrowetting elements 2 are for example as described above with reference to FIGS. 1 and 2. For example, the electrowetting display device may include a first support plate including a first electrode, a second support plate, a first fluid and a second fluid immiscible with the first fluid. The first fluid and the second fluid in examples are located between the first support plate and the second support plate. A second electrode, such as that described above with reference to FIGS. 1 and 2 is in electrical contact with the second fluid. Each electrowetting element of the electrowetting display device includes a portion of the first fluid and an electrowetting element electrode in examples. The electrowetting display device may also include an electrical connector connecting the first electrode to the second electrode and a barrier structure at least partly surrounding the electrical connector, such as the electrical connectors and barrier structures described above with reference to FIGS. 3 to 8. For example, the barrier structure may extend along two or three sides of the electrical connector.

The apparatus 70 in FIG. 9 is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance. The apparatus 70 has a housing element H. The housing element H is for example formed of moulded plastic and an exterior piece of an e-reader housing. The housing element H has a window, a perimeter of which is indicated with the label W in FIG. 9. Such a window is for example an aperture, opening, gap, optically transparent layer or other feature in the housing element H through which at least light in the visible spectrum may be transmitted. The window is sized and shaped to in examples correspond with a size and shape of the display device, more specifically the array or matrix of electrowetting elements. Thus, a display effect output by the electrowetting elements is viewable through the window. For example, the first fluid and the second fluid of the display device are typically viewable through the window. In some examples, such as where the electrowetting elements operate by reflecting light for example from the surrounding environment of the display device, the window also permits ambient light to be transmitted through the window and onto the electrowetting elements. The housing element H has a frame F surrounding the window, for example such that the frame F surrounds the matrix of electrowetting elements.

In the example of FIG. 9, the barrier structure is overlapped by at least part of the frame F. In this example, the barrier structure is arranged in a border region 72 of the electrowetting display device and the frame F overlaps, for example covers, the border region 72. In other examples, the frame F may only partly overlap or cover the border region 72. The frame may not overlap some or all of the barrier structure in examples. The border region may include similar components, for example a first electrode, flexible films, contact lines etc., as the border regions described above with reference to FIGS. 3 to 8.

The at least part of the frame that overlaps the barrier structure may be substantially opaque to light. For example, the frame may conceal or mask the barrier structure, preventing light, such as visible light, from being transmitted from the barrier structure to a user. In this way, the barrier structure may not be viewable to the user of the apparatus.

In examples, the apparatus includes a seal connecting the first support plate to the second support plate, such as the seal 30 described with reference to FIGS. 3 and 4. The barrier structure may be located as described above in examples. For example, the barrier structure may be located between the electrical connector and the seal, as in the electrowetting display device illustrated in FIGS. 3 and 4, or the barrier structure may be located between the electrical connector and an electrical or electronic component connected to the first electrode, as shown in FIG. 6. The seal may also be overlapped by the frame. For example, the seal may have a similar or corresponding shape in plan view to the perimeter of the window, such as rectangular as in the apparatus 70 of FIG. 9, but be larger than the perimeter of the window such that the seal is not viewable through the window and is covered by the frame. In other examples, the seal and the perimeter of the window may have different shapes and/or sizes.

Figure 10:
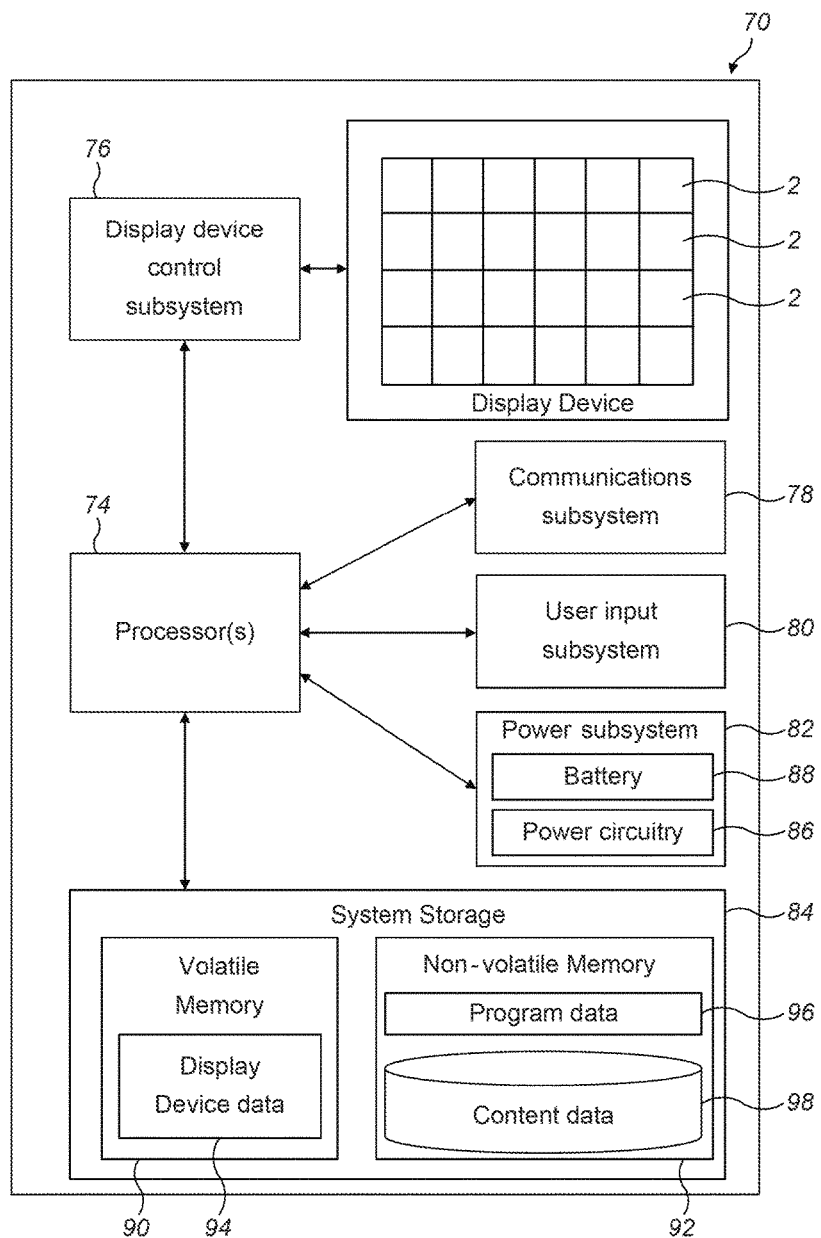
FIG. 10 shows a schematic system diagram of an example apparatus including an electrowetting display device.

The apparatus 70 of FIG. 9 typically also includes at least one processor and at least one memory. A system diagram illustrating an example of a basic hardware architecture of the apparatus 70 is shown in FIG. 10. The apparatus 70 includes at least one processor 74 connected to and therefore in data communication with for example: a display device control subsystem 76, a communications subsystem 78, a user input subsystem 80, a power subsystem 82 and system storage 84. The display device control subsystem is connected to and is therefore in data communication with the electrowetting display device 1. The at least one processor 74 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 84. The at least one processor may additionally, or in the alternative, contain memory, such as processor registers.

The display device control subsystem 76 for example includes electrowetting element driver components, for use in applying a voltage to any of the electrowetting elements, to address different such electrowetting elements. In examples the electrowetting elements are configured according to an active matrix configuration and the display device control subsystem is configured to control switching elements such as thin film transistors (TFTs) of the display device 1 via circuitry to control the electrowetting elements. The circuitry may include signal and control lines. For example, the display device control subsystem 76 may include display drivers such as display column drivers and display row drivers.

The communications subsystem 78 for example is configured for the apparatus to communicate with for example a computing device via a data network, for example a computer network such as the Internet, a local area network, a wide area network, a telecommunications network, a wired network, a wireless network, or some other type of network. The communications subsystem 78 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 80 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 82 for example includes power circuitry 86 for use in transferring and controlling power consumed by the apparatus. The power may be provided by a mains electricity supply or from a battery 88, via the power circuitry. The power circuitry may further be used for charging the battery from a mains electricity supply.

The system storage 84 includes at least one memory, for example at least one of volatile memory 90 and non-volatile memory 92 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a configuration of a portion of the first fluid of an electrowetting element of the array of electrowetting elements, for example to control a display effect provided by the electrowetting display device.

In the example of FIG. 9, the volatile memory 90 stores for example display device data 94 which is indicative of display effects to be provided by the display device 1. The processor 74 may transmit data, based on the display device data, to the display device control subsystem 76 which in turn outputs signals to the display device for applying voltages to the electrowetting elements, for providing display effects from the display device. The non-volatile memory 92 stores for example program data 96 and/or content data 98. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

Figure 11:
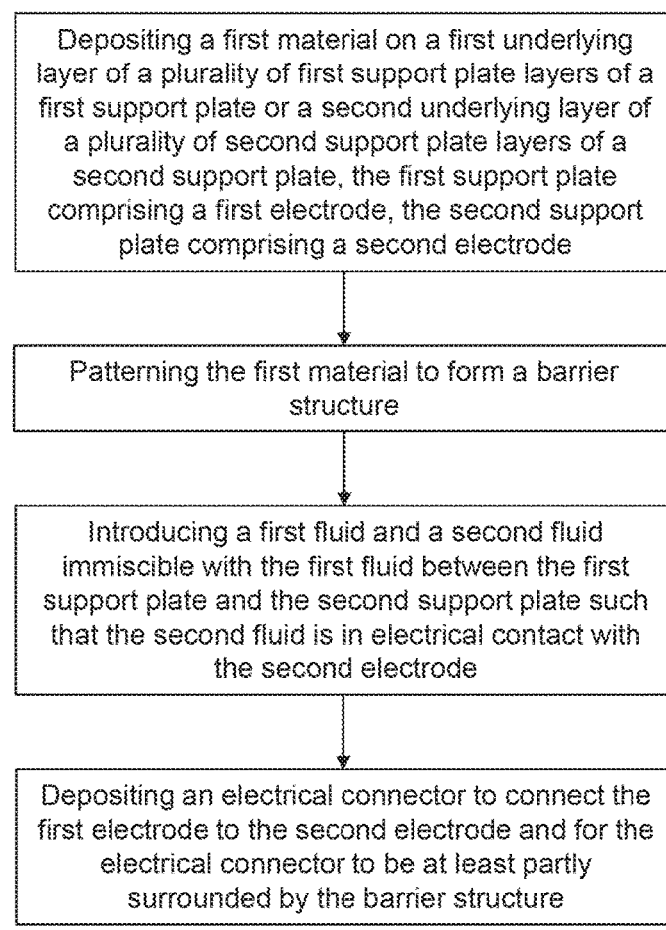
FIG. 11 is a flow diagram relating to examples of a method of manufacturing an electrowetting display device.

A method of manufacturing an electrowetting display device according to examples, such as the electrowetting display device described above, will now be described with reference to FIG. 11. Features referred to with reference to FIG. 11 are similar to those described above with reference to FIGS. 1 to 10; corresponding descriptions apply.

During the manufacturing process, the first support plate and/or the second support plate may be manufactured entirely, or may be provided during the manufacturing process as a partly or completely assembled support plate.

When manufacturing the first support plate according to examples, the substrate 7a is provided. Then, a plurality of electrowetting element electrodes 17 are provided on the substrate 7. A first electrode 76 may be provided at the same time as providing the plurality of electrowetting element electrodes 17, for example in the same process step, e.g. as part of the same layer of electrically conductive material, or before or after. The electrowetting element electrodes and the first electrode each may be deposited using for example a physical vapour deposition (PVD) technique such as sputtering, with an appropriate mask, as would be appreciated by the skilled person. Subsequently, the insulating layer 13, which in this example includes the dielectric layer 16 and the hydrophobic layer 15, is provided on the electrowetting element electrode 17. Dielectric material, for example to form the dielectric layer, may be provided using Chemical Vapor Deposition (CVD) or Physical Vapor Deposition (PVD) for example sputter deposition or electron beam evaporation where temperature, pressure and power are controlled appropriately, as would be understood by the skilled person. The hydrophobic layer 15 may then be provided on the dielectric layer, or in other examples on the electrowetting element electrode, for example by a wet coating process such as slit coating, flexoprinting, spin coating or dip coating as is well known in the art. The hydrophobic layer in examples is a continuous uninterrupted layer of the first support plate common to all electrowetting elements. A layer of wall material may be provided on the hydrophobic layer 15, for example using a slot die coating or a spincoating process, and then patterned using a lithographic process to form the walls 21. The wall material may comprise an organic and/or a photoresist material, such as SU8.

The second support plate may be manufactured similarly to the first support plate, for example, by providing the second electrode 19 on the substrate 7b for example using a physical vapour deposition (PVD) technique such as sputtering, with an appropriate mask.

In the example method of FIG. 11, a first material is deposited on a first underlying layer of a plurality of first support plate layers of a first support plate or on a second underlying layer of a plurality of second support player layers of a second support plate. For example, the first underlying layer of the first support plate may be the layer of wall material, as illustrated in FIG. 4. References herein to deposition of a material on an underlying layer are envisaged to encompass deposition of a material directly on, and therefore in contact with, the underlying layer or deposition of the material such that there is an intervening layer or layers between the material and the underlying layer such that the material is not in direct contact with the underlying layer, but is nevertheless generally supported by the underlying layer. For example, the material may overlap or be located above the underlying layer.

The second underlying layer of the second support plate may be the second electrode layer or the substrate 7b or another second support plate layer. The first material may be deposited for example using a slot die coating or spincoating process. The first material for example comprises a photoresist material, such as SU8, and/or may comprise an organic material.

In the example method of FIG. 11, the first material is patterned to form a barrier structure, such as the barrier structure described above according to examples. The first material may be patterned for example using appropriate masking and developing of the first material, e.g. using photolithography. The first fluid and the second fluid may be introduced between the first support plate and the second support plate using any suitable method and the first support plate and the second support plate may be connected together with a seal, with the barrier structure separated from the first fluid and the second fluid by the seal, although in other examples the electrowetting display device may not include a seal. As will be appreciated by the skilled person, the seal may be applied as a fluid and subsequently hardened, for example by curing using ultraviolet light. For example, the seal may be an epoxy resin such as XNR 5570, available from Nagase & Co., Ltd., 5-1, Nihonbashi-Kobunacho, Chuo-ku, Tokyo 103-8355, Japan. The seal may be cured after the seal is brought into contact with both the first and second support plates and may be cured after the first and second fluids are introduced between the support plates.

In examples, the first fluid is dispensed on the hydrophobic layer of the first support plate and the second fluid is dispensed to form a layer on top of the first fluid before the first and second support plates are joined together by the seal. However, in other examples, the first and second support plates may be connected by the seal before the first and second fluids are introduced between the first and second support plates, for example where the first and second fluids are injected through a gap in the seal, which is subsequently filled in or closed. In further examples, the electrowetting display device may not include a seal.

The method in the example of FIG. 11 further includes depositing an electrical connector to connect the first electrode to a second electrode in electrical contact with the second fluid, such as the second electrode described above.

The electrical connector in examples is deposited so that it is at least partly surrounded by the barrier structure and separated from the first fluid and the second fluid by the seal, although in other examples the electrical connector may be deposited in a different location with respect to the seal and the first and second fluids, or the seal may be absent. The electrical connector is for example deposited or dispensed as a paste, for example by injection of the electrical connector to a desired location. The electrical connector may for example be dispensed using a needle. Use of a paste may facilitate deposition of the electrical connector, for example where it is desired to deposit the electrical connector at a precise location. In examples including connecting the first and second support plates with a seal, the seal and the electrical connector may be deposited before the first and second support plates are connected. The seal may, for example, be deposited on one of the first support plate or the second support plate and the electrical connector may be deposited on the other of the first support plate or the second support plate before the support plates are brought together. The first and second support plates may subsequently be moved towards each other to connect the first electrode to the second electrode via the electrical connector and to connect the support plates together via the seal. In such cases, the barrier structure may have been formed before dispensing the electrical connector. The barrier structure may be formed on or as part of the same support plate onto which the electrical connector is deposited so that the electrical connector can be dispensed, e.g. by injection, onto the same support plate on a region of the support plate at least partly surrounded by the barrier structure.

In other examples, the first material is deposited and patterned and the first and support plate are connected via the seal before the electrical connector is deposited. In these examples, the seal may also be cured before the electrical connector is deposited. Where a plurality of electrowetting display devices are made with a common substrate and are subsequently separated, e.g. using a scribe and break process, the electrowetting display devices may be separated before the electrical connector is deposited. In such cases, the barrier structure may be formed such that there is a gap to allow the electrical connector to be injected in or on an area or region, e.g. of the first or second support plate, partly surrounded by the barrier structure.

After deposition of the electrical connector, a carrier fluid of the electrical connector may be evaporated. This may leave a more solid electrical connector connecting the first and second electrodes in the display device. Such a more solid electrical connector may provide a more reliable connection between the first and second electrodes than a more liquid or fluid electrical connector, that may for example flow or move if the display device is moved, e.g. by a user.

The above examples are to be understood as illustrative examples. Further examples are envisaged. For example, in FIG. 5, the spacers 46 and the barrier structure 42 are both part of the same support plate (the first support plate 5). In other examples, both the spacers 46 and the barrier structure may be part of the second support plate 6 or one or more spacers may be on or part of a different support plate than the barrier structure. Barrier elements may be on or part of different support plates from each other. For example, the barrier structure may include a first plurality of barrier elements on or as part of the first support plate and a second plurality of barrier elements on or as part of the second support plate. The first and second plurality of barrier elements may for example be aligned to be brought into contact with each other when the first and second support plates are moved together, to at least partly surround the electrical connector. In other examples, the first and second plurality of barrier elements may be arranged so as to not overlap or be aligned with each other. For example, the first plurality of barrier elements may be arranged to protrude from the first support plate to, and in contact with, the second support plate, and vice versa for the second plurality of barrier elements. With such a barrier structure, some or all of the barrier elements may extend only partly from one support plate to the other. For example, the first plurality of barrier elements may extend from the first support plate to halfway or further between the first support plate and the second support plate and the second plurality of barrier elements may extend from the second support plate to halfway or further between the first support plate and the second support plate.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting display device comprising:
   a first support plate comprising a first electrode;
   a second support plate comprising a second electrode;
   a first fluid;
   a second fluid immiscible with the first fluid, the first fluid and the second fluid located between the first support plate and the second support plate, the second fluid in contact with the second electrode;
   an electrical connector connecting the first electrode to the second electrode; and
   a barrier structure at least partly surrounding the electrical connector.

2. The electrowetting display device according to claim 1, comprising a seal connecting the first support plate to the second support plate, the electrical connector and the barrier structure separated from the first fluid and the second fluid by the seal.

3. The electrowetting display device according to claim 1, wherein the electrical connector comprises one or more of: electrically conductive particles, silver particles, an adhesive, balls comprising gold, or balls each comprising a gold surface respectively.

4. The electrowetting display device according to claim 1, wherein the barrier structure extends along two or three sides of the electrical connector.

5. The electrowetting display device according to claim 1, comprising a seal connecting the first support plate to the second support plate, the barrier structure located between the electrical connector and the seal.

6. The electrowetting display device according to claim 1, comprising a display driver, the barrier structure located between the electrical connector and the display driver.

7. The electrowetting display device according to claim 1, wherein one of: the first support plate or the second support plate comprises the barrier structure.

8. The electrowetting display device according to claim 1, wherein the barrier structure is between the first support plate and the second support plate, and wherein the barrier structure is in contact with one or both of the first support plate and the second support plate.

9. The electrowetting display device according to claim 1, wherein the barrier structure is a wall comprising one or more of: at least two substantially straight wall segments, a curved wall segment, or a substantially u-shaped segment.

10. The electrowetting display device according to claim 1, wherein the barrier structure comprises a plurality of barrier elements.

11. The electrowetting display device according to claim 10, wherein one or more of the plurality of barrier elements is one or more of: a wall, a post, a block or a pillar.

12. The electrowetting display device according to claim 1, wherein the barrier structure comprises a plurality of barrier elements, the plurality of barrier elements comprising:
   a first row of barrier elements, the first row comprising a first barrier element and a second barrier element with a first gap therebetween; and
   a second row of barrier elements, the second row comprising a third barrier element and a fourth barrier element with a second gap therebetween,
   the first gap offset from the second gap.

13. The electrowetting display device according to claim 1, comprising a seal connecting the first support plate to the second support plate, one of the first support plate or the second support plate comprising a spacer which extends towards the other of the first support plate or the second support plate, wherein the spacer is substantially electrically non-conductive, and the spacer is separated from the first fluid and the second fluid by the seal.

14. The electrowetting display device according to claim 13, wherein the barrier structure is elongate in a direction parallel to a plane of the second support plate so as to at least partly surround the electrical connector, and the spacer is elongate in a direction perpendicular to the plane of the second support plate to extend between and in contact with the first support plate and the second support plate.

15. The electrowetting display device according to claim 1, wherein the barrier structure comprises a photoresist material.

16. The electrowetting display device according to claim 1, comprising an array of electrowetting elements and a seal connecting the first support plate to the second support plate, the seal surrounding a periphery of the array of electrowetting elements, each electrowetting element of the array of electrowetting elements respectively comprising:
   a portion of the first fluid; and
   an electrowetting element electrode,
   the second fluid shared by the array of electrowetting elements.

17. An apparatus comprising:
   an electrowetting display device comprising:
      a first support plate comprising a first electrode;
      a second support plate comprising a second electrode;
      a first fluid;
      a second fluid immiscible with the first fluid, the first fluid and the second fluid located between the first support plate and the second support plate, the second fluid in contact with the second electrode;
      an array of electrowetting elements, each electrowetting element of the array of electrowetting elements respectively comprising:
         a portion of the first fluid; and
         an electrowetting element electrode;
      an electrical connector connecting the first electrode to the second electrode; and
      a barrier structure at least partly surrounding the electrical connector;

a housing element having a window and a frame surrounding the window, the first fluid and the second fluid viewable through the window;

at least one processor; and at least one memory comprising computer program instructions, the at least one memory and the computer program instructions configured to, with the at least one processor, control application of a voltage between the second electrode and an electrowetting element electrode of an electrowetting element of the array of electrowetting elements to control a configuration of the portion of the first fluid of the electrowetting element.

18. The apparatus according to claim 17, wherein the barrier structure is overlapped by at least part of the frame.

19. The apparatus according to claim 18, wherein the at least part of the frame is substantially opaque to light.

20. The apparatus according to claim 17, wherein the barrier structure extends along two or three sides of the electrical connector.

21. The apparatus according to claim 17, comprising a seal connecting the first support plate to the second support plate, the barrier structure located between the electrical connector and the seal.

22. The electrowetting display device according to claim 1, wherein the barrier structure comprises a first plurality of barrier elements and a second plurality of barrier elements, the first support plate comprising the first plurality of barrier elements and the second support plate comprising the second plurality of barrier elements.

23. The electrowetting display device according to claim 22, wherein the first plurality of barrier elements contacts the second plurality of barrier elements.

24. The electrowetting display device according to claim 1, wherein:

the barrier structure comprises a first photoresist material; and the electrowetting display device comprises an electrowetting element and a wall which substantially confines a portion of the first fluid to the electrowetting element, the wall comprising a second photoresist material different from the first photoresist material.

25. The apparatus according to claim 17, comprising a seal connecting the first support plate to the second support plate, the electrical connector and the barrier structure separated from the first fluid and the second fluid by the seal.

26. The apparatus according to claim 17, wherein the electrical connector comprises one or more of: electrically conductive particles, silver particles, an adhesive, balls comprising gold, or balls each comprising a gold surface respectively.

* * * * *